United States Patent [19]

Doerr

[11] 4,060,281
[45] Nov. 29, 1977

[54] COAL SLURRY FEEDER

[75] Inventor: Richard E. Doerr, Ponca City, Okla.

[73] Assignee: Continental Oil Company, Ponca City, Okla.

[21] Appl. No.: 740,446

[22] Filed: Nov. 10, 1976

[51] Int. Cl.² .................................................. B65G 53/30
[52] U.S. Cl. ........................................ 302/14; 302/15
[58] Field of Search .............. 302/14, 15, 16; 299/18, 299/64

[56] References Cited

U.S. PATENT DOCUMENTS

| 3,870,373 | 3/1975 | Doerr et al. ............................ 302/14 |
| 3,966,261 | 6/1976 | Doerr et al. ............................ 302/14 |
| 3,981,541 | 9/1976 | Doerr et al. ........................ 302/14 X |

Primary Examiner—Evon C. Blunk
Assistant Examiner—James L. Rowland
Attorney, Agent, or Firm—William J. Miller

[57] ABSTRACT

A feeder apparatus for transferring particulate material and water from a sump outlet to the inlet of a pump is formed in the sump by making a well at the outlet of the sump and placing an impeller in the well. A partition is formed separating the inlet to the feeder from its outlet, the partition having a height equal to or exceeding that of the water level in the sump. The outlet from the sump is connected to a channel which has a continually decreasing cross-sectional area, the terminus of which is connected to the inlet of the pump. A fluid jet can be mounted at the inlet of the feeder for reducing the concentration of particulate fluids at the pump inlet or for fluidizing the particles at the entrance of the pump.

3 Claims, 3 Drawing Figures

COAL SLURRY FEEDER

BRIEF DESCRIPTION OF THE PRIOR ART

Sumps with means for increasing the concentration of the particulate matter to water ratio are illustrated in U.S. Pat. Nos. 3,981,541 and 3,870,373, both of which are issued to Richard E. Doerr, David L. McCain, and Hilbert D. Dahl. In the first-mentioned patent the solids in the sump are moved to a depression by a mechanical means where the material is removed by means of a pump. In the last-mentioned patent the material is moved to the pump inlet by providing a sufficient angle to the bottom of the sump so that it exceeds the natural repose angle for the material being dumped into the sump. A vertical sump is illustrated in U.S. Pat. No. 3,966,261. The material is concentrated in that patent by transferring the particulate matter and fluids to a second depression below the sump. Concentration in all three patents is enhanced by accumulation of particulate matter. In none of the patents can concentration be controlled to any degree.

BRIEF DESCRIPTION OF THE INVENTION

In this invention a feeder apparatus is devised and mounted between the sump output and the pump input. The particulate matter and water is physically transferred by means of an impeller from the sump to the input of the pump at a controlled rate. A jet is provided to reduce the concentration if the concentration is in excess of that desired. The jet also provides a means for fluidizing the region around the input if the system should be inoperative for a period of time. The output of the feeder is connected to the pump by a channel of continually decreasing cross-sectional area. Such a channel will cause a continually increasing velocity to the fluid passing through it. A continually increasing velocity will maintain the particular solids dispersed throughout the fluid, thereby preventing the solids from settling out and plugging the inlet.

DETAILED DESCRIPTION OF THE DRAWINGS

Figure 1:
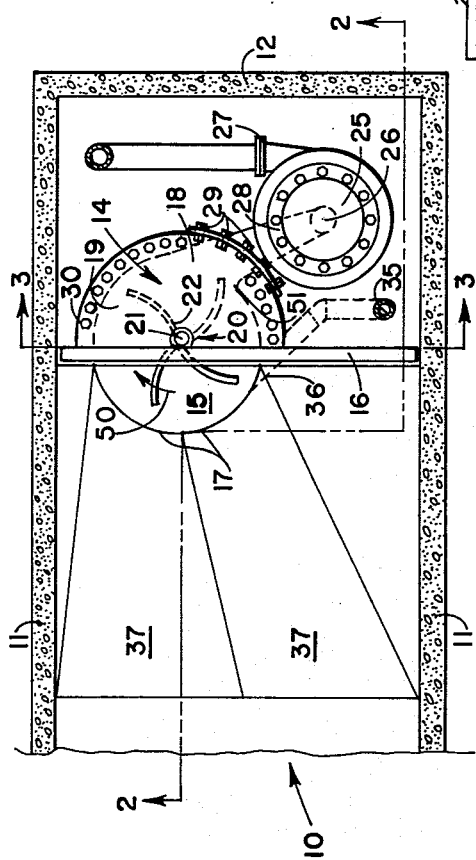
FIG. 1 is a top view of a portion of the sump and illustrates the position of the feeder and the pump.

Referring to all of the drawings but in particular to FIG. 1, a sump generally referred to by arrow 10 has sidewalls 11 and a sidewall or endwall 12. A feeder assembly generally referred to by arrow 14 comprises a well 15 which has, in the preferred embodiment, vertical sides and a flat bottom. A vertical partition 16 extends across well 15 and abuts sidewalls 11. It has a height which should exceed the height of the particular matter in sump 10 and generally will have a height equal to the water level in the sump. It does not, however, of necessity need to be water tight. Feeder 14 has an inlet 17 and outlet 18. The portion of the feeder between partition 16 and endwall 12 is covered by a shroud 19 and attached securely to the well by a plurality of bolts 30. An impeller 20 is rotatably mounted in well 15 and connected to a shaft 21. Attached to shaft 21 is a plurality of blades 22 extending radially outward from said shaft 21 and having a width substantially equal to the distance between the bottom of well 15 and the underside of shroud 19. Shaft 21 may be rotatably mounted to partition 16 by means of a plurality of bearings 23. A motor 31 can be coupled through any mechanical coupling 32 to shaft 21. Motor 31 is preferably a variable speed drive-type motor but can be a fixed speed motor. The wall configuration of well 15 is generally that of a volute. Shaft 21 is positioned in well 15 so that blade 22 will just clear the cutwater point 51. The radius from the center of shaft 21 as it is measured to the vertical wall of well 15 will gradually increase as it is rotated counterclockwise in the direction of arrow 50 until it reaches the outlet 18 of feeder 14.

Figure 2:
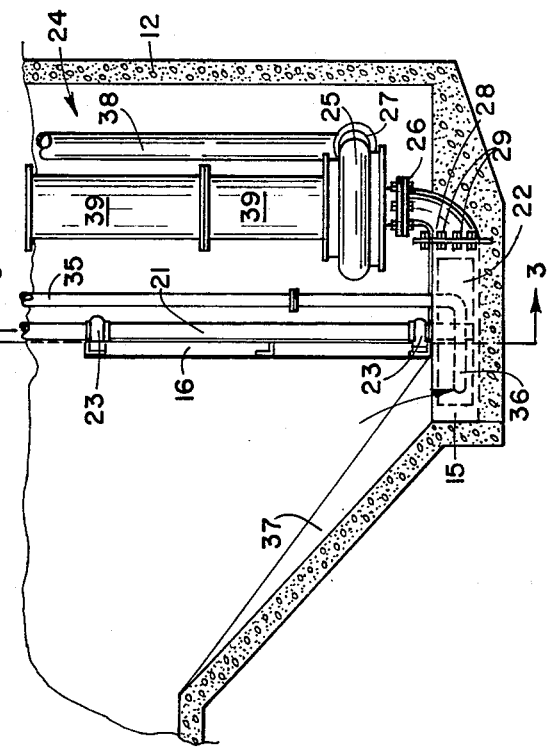
FIG. 2 is a cross-sectional view of FIG. 1 taken through lines 2—2.
Figure 3:
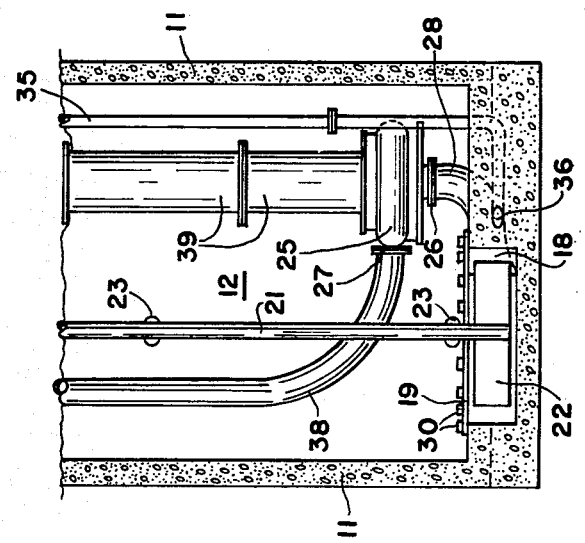
FIG. 3 is a cross-sectional view of FIGS. 1 or 2 taken through lines 3—3.

A pump 25 is positioned in a room 24 which can be defined as the space formed between partition 16, endwall 12, and sidewalls 11. Pump 25 is illustrated as being vertically mounted, however, any form of pump can be used at this location, either vertically or horizontally mounted or mounted at some other physical location. The pump 25 has an inlet 26 (see FIGS. 2 or 3) and outlet 27. The inlet 26 of pump 25 is connected through a channel 28 to inlet 18 of feeder 14. The channel 28 can be in the shape of an "elbow" with a gradually increasing cross-sectional area from the inlet terminus at 26 to the feeder connection at 18. In the preferred embodiment, the channel 28 will be formed of cast iron fabricated from welded steel plates or some other metal and may be bolted to the feeder by means of bolts 29. A slurry outlet pipe 38 is attached to the outlet 27 of pump 25 and connects to the subsequent transportation system for removing the slurry from the mine. A pipe 35 is connected to a jet 36 which is shown positioned at the inlet 17 of feeder 14. Only a single jet is shown in this embodiment. It is obvious that a plurality of jets can be used or the single jet can have some other location since the main purpose of the jet is to function as a means for reducing concentration by applying water to the region of the inlet 17 or by fluidizing solidified or packed particulate material which may accumulate during the period of time the feeder system is not in operation.

Ramps 37 in sump 10 provide a simple gravity conveyer for the particulate matter to enter inlet 17 of feeder 14. It is obvious, of course, that a mechanical device can be used as illustrated in U.S. Pat. No. 3,981,541 or that the entire sump can be the gravity feed type as is illustrated in U.S. Pat. No. 3,870,373.

OPERATION

The above device operates in the following manner:

Particulate matter is dumped into sump 10 along with water in the form of a slurry. The particulate matter, however, tends to settle out of the water and fall to the bottom of the sump where it will accumulate on ramps 37 and be conveyed into inlet 17 of feeder 14. Motor 31, if not previously energized, is energized causing shaft 21 to rotate through mechanical coupling 32. Blades 22 will rotate in the direction of arrow 50 moving the particulate matter and water from inlet 17 around the feeder and into the outlet 18 of feeder 14. Since the shape of the vertical wall of the feeder 14 has a volute configuration, the additional material being picked up as blades 22 are rotated will maintain the flow of material at a fairly constant rate until it enters channel 28. As blade 22 reaches the cutwater point, a sudden decrease in volume is reached. Since channel 28 has less resistance to the flow of the slurry, it will enter channel 28. Since channel 28 has a gradually decreasing cross-sec tional area, the velocity and turbulence will tend to increase as the slurry moves forward to inlet 28 of pump 25. The increase in velocity and turbulence tends to maintain the particulate solids in suspension in the water, thereby preventing the particles from settling out and jamming the inlet 26. The volute type configuration of the feeder also tends to create its own type suction which will pull the material from inlet 17 into the feeder 14. When a concentration in excess of that desired is being forced into inlet 26 of pump 25, additional fluids can be added by applying water under pressure to pipe 35 and subsequently to jet 36. The flood of water at the inlet can be controlled to reduce the concentration to that desired. Furthermore, the revolutions of shaft 21 can be varied to accommodate the capacity of pump 25, thereby preventing cavitation of the pump and providing a predetermined desired concentration of particulate matter to water.

As previously suggested there is no need to waterproof pump 24, however, for convenience in maintenance pump 24 can be waterproofed if the apparatus is constructed in the manner illustrated in the drawings. Necessary seals would need to be inserted around shaft 21, shroud 19, and the attachment of channel 28 to feeder 14 along with waterproofing partition 16. If the pump motor is mounted in a water-filled environment, then a plurality of large diameter pipes 39 can be easily used to seal out the water from the pump motor. Of course, a motor designed for underwater use can also be provided. In addition, a shaft can be provided since the motor is not mounted at the pump location.

Throughout the specification the preferred embodiment has been explained using water as the fluid carrier. It is obvious that other fluids, such as oil or methanol, for example, can be utilized to form a slurry, and such a slurry will function in the same manner as that described for water, and the invention is not so limited so as to be restricted as to the particular type fluid disclosed.

Although only the preferred embodiment of the present invention has been illustrated and described, it will be apparent to those skilled in the art that various changes and modifications may be made therein without departing from the spirit and scope of the invention or from the scope of the appended claims.

What I claim is:

1. A feeder apparatus for transferring particulate material and water from a sump outlet to a pump inlet wherein said sump has sidewalls and a bottom; a well having sidewalls and a bottom formed in the bottom of said sump and having an outlet, and an inlet communicating with the bottom of said sump; means for moving said particulate materials from said sump into the inlet of said well; impeller means mounted in said well for moving said material from said well inlet to said well outlet; pump means having an inlet connected to the outlet of said well; and means for imparting a velocity to said water and particulate material, said velocity being sufficient to cause said particulate material to enter the inlet of said pump means.

2. A feeder as described in claim 1 wherein said feeder includes a controllable water supply means at said well inlet for fluidizing said particulate material and for controllably reducing the particulate material to water ratio.

3. A concentration apparatus for a slurry sump which is adapted to be filled with particulate solids and water, said sump having sidewall means and a bottom, said concentration apparatus comprising a pump room means formed along one of said sidewalls and having a bottom portion; well means formed into said bottom portion; vertical partition means mounted across said well means and extending to the top of said sump and between said sidewall means to enclose said pump room means, said well means having an inlet to said sump and an outlet to said pump room means; impeller means rotatably mounted in said well means and including at least a blade means for movement from said inlet to said outlet; pump means having an inlet coupled to the outlet of said well means and means for increasing the velocity of particulate movement through said well and to said well outlet by an amount sufficient to withdraw substantially all of said particulate material from said well outlet by said pump means.

* * * * *